United States Patent
Chuang et al.

(10) Patent No.: US 6,488,269 B1
(45) Date of Patent: Dec. 3, 2002

(54) WET SCRUBBER

(75) Inventors: Johnson Chuang, Ta-Li (TW); Jackson Chuang, Ta-Li (TW)

(73) Assignee: United Microelectronics Corp. (TW)

( * ) Notice: Subject to any disclaimer, the term of this patent is extended or adjusted under 35 U.S.C. 154(b) by 0 days.

(21) Appl. No.: 09/865,803

(22) Filed: May 29, 2001

(51) Int. Cl.⁷ .................................................. B01F 3/04
(52) U.S. Cl. ........................ 261/29; 261/64.1; 261/123; 261/DIG. 9; 96/262; 96/279; 96/296; 96/332
(58) Field of Search ........................... 261/29, 36.1, 46, 261/64.1, 77, 113, DIG. 9; 96/262, 269, 276, 279, 282, 286, 296, 299, 332, 351, FOR 123, FOR 137

(56) References Cited

U.S. PATENT DOCUMENTS

| | | | | |
|---|---|---|---|---|
| 3,648,435 A | * | 3/1972 | Soria et al. ................... | 96/282 |
| 3,984,219 A | * | 10/1976 | Huang ........................ | 96/262 |
| 4,206,157 A | * | 6/1980 | Plasmati ..................... | 261/123 |
| 4,375,977 A | * | 3/1983 | Honerkamp et al. .......... | 96/351 |
| 4,661,130 A | * | 4/1987 | Ebeling et al. ............... | 96/351 |
| 5,335,785 A | * | 8/1994 | Kawatra et al. ............. | 261/123 |
| 5,858,072 A | * | 1/1999 | Motoda ....................... | 96/332 |
| 6,325,361 B1 | * | 12/2001 | Van Duijn .................... | 96/299 |

* cited by examiner

Primary Examiner—C. Scott Bushey
(74) Attorney, Agent, or Firm—Powell Goldstein Frazer & Murphy LLP

(57) ABSTRACT

A scrubber for removing soluble materials from harmful gaseous effluents with high efficiency and safety is disclosed. By using twice mixes of the scrubbing liquid and the harmful gaseous effluent, the scrubber meets the standards of environmental protection. The scrubber of this invention also prevents the problems of factory safety presented in the conventional fume scrubber. Owing to the high efficiency of the mixing of the harmful gaseous effluent and the scrubbing liquid, the production facilities or processing units need not stop operating once the supply of the scrubbing liquid terminates.

20 Claims, 3 Drawing Sheets

WET SCRUBBER

BACKGROUND OF THE INVENTION

1. Field of the Invention

The present invention relates to a scrubber for removing soluble materials from toxic gases, and more particularly to a scrubber for removing soluble materials from harmful gaseous effluents with high efficiency and safety.

2. Description of the Related Art

Semiconductor manufacturing facilities utilize chemical vapor deposition, etching and a wide variety of other unit operations in the fabrication of modern semiconductor devices using process gases such as $SF_6$, $SiCl_4$, $SiH_2Cl_2$, and $WF_6$. The gaseous effluent from processing units in such facilities comprise the unconsumed process gases, as well as by-products of such gases. The gaseous effluent additionally may contain significant quantities of particulates such as silica, which must be removed, in addition to various water soluble components such as hydrochloric acid and residuals of phosphine and arsine.

Water scrubbing is commonly used to remove such particulates and water-soluble gases from the process effluent stream. In such scrubbing, the effluent gas is intimately contacted with water, e.g., by passage of the gaseous effluent through a water spray, to dissolve the soluble gas components and wet and thereby remove the particulates. The scrubbing liquid may then be filtered to remove the scrubbed particulates from the scrubbing medium. The water scrubber unit typically is deployed immediately upstream of a bulk exhaust for the entire plant facility, and is used to treat the process facility effluent, which may vary considerably in concentration of water-soluble components and particulates, depending on the specific types of semiconductor devices or subassembly parts which are being manufactured, and the resulting "mix" of unit operations being carried out in the process facility.

FIG. 1A shows a conventional fume scrubber 100. As shown in FIG. 1A, a scrubbing chamber 110 having a filter region 120 therein is shown. The filter region 120 comprises an upper perforate diverter plate 122 and a lower perforate plate 124. A plurality of filter media 126 are packed into the filter region 120 and between the perforate diverter plate 122 and the perforate plate 124. The detail structure of the filter media 126 is shown in FIG. 1B and the filter media 126 is comprised of plastic packing spheroids formed of open annular loops as shown in the figure. In the top of the scrubbing chamber 110, there are a gas inlet 112*a*, an opening 112*b*, fluid inlets 114*a* and 114*b*. A dry exhaust pump 152 exhausts the gaseous effluent from processing units to the scrubbing chamber 110 through a gas exhaust conduit 132 connecting the gas inlet 112*a*. An $N_2$ purge conduit 133 is connected to the gas exhaust conduit 132. A gas discharge conduit 134 connecting to a main gas discharge conduit (not shown) is through the top of the scrubbing chamber 110 and the filter region 120 by the opening 112*b*. The gas discharge conduit 134 has a gas inlet 135 with a tilt opening under the perforate plate 124. A tap water supply pipe 136 connects the scrubbing chamber 110 by the fluid inlets 114*a*. There are also a fluid outlet 116*a* and an opening 116*b* on the bottom of the scrubbing chamber 110 as shown in FIG. 1A. A recirculation pump 154 exhausts the scrubbing water from the bottom of the scrubbing chamber 110 back to the filter region 120 via a recirculation pipe 138. The two ends of the recirculation pipe 138 individually connect the scrubbing chamber 110 at the fluid inlets 114*b* and the fluid outlet 116*a*. An over flow drain pipe 140 used to drain excess scrubbing water is disposed through the bottom of the scrubbing chamber 110 by the opening 116*b*, and the over flow drain pipe 140 has a fluid outlet 142 used to drain the excess scrubbing water.

In the operation of the conventional fume scrubber 100, the gaseous effluent from processing units is exhausted through the gas exhaust conduit 132 into the scrubbing chamber 110 by the dry exhaust pump 152, wherein the $N_2$ purge conduit 133 provides dry $N_2$ gas to exclude moisture so that less contamination or clump of particulates will precipitate. The gaseous effluent passes the filter region 120 and contacts with the tap water from the tap water supply pipe 136, and the water-soluble gas components will solve in the tap water. Owing to the open annular loops of the filter media 126, the water-soluble gas components will solve in the tap water flowing along the open annular loops more effectively. After contacting and adsorbing the gas components, the tap water transfers to scrubbing water and flows to the bottom of the scrubbing chamber 110. The scrubbing water accumulates at the bottom of the scrubbing chamber 110 until the scrubbing water surface reaches the fluid outlet 142, and the excess scrubbing water will be drain through the over flow drain pipe 140 to a main drain pipe which is not shown in FIG. 1A. The scrubbing water also will be exhausted through the recirculation pipe 138 back to the filter region 120 by the recirculation pump 154. The scrubbing water will remix with the gaseous effluent through the recirculation cycle set forth. After passing the filter region 120 and mixing with the tap water and the scrubbing water, the gaseous effluent will be exhausted through the gas discharge conduit 134 to the main gas discharge conduit (not shown).

However, it is found that the drawbacks of the conventional fume scrubber 100 present environment protection issues and production facility malfunctions, and even result in factory safety problems. For example, the scrubbing water is usually exhausted together with the gaseous effluent through the gas discharge conduit 134 to the main gas discharge conduit (not shown) after passing the filter region 120 thereby results in the pump malfunctions of the production facilities connected to the main gas discharge conduit and even causes serious factory safety problems. Furthermore, the mixing efficiency of the gaseous effluent with the tap water and the scrubbing water is not satisfactory and the environment protection issues will arise from the interruption of the tap water, and thus the production facilities must be shut down. In view of the drawbacks mentioned above, it is desirable to provide an advance scrubber that can prevent the problems of the conventional fume scrubber set forth, it is toward these goals that this invention specially directs.

SUMMARY OF THE INVENTION

It is therefore an object of the invention to provide an advance scrubber having high recirculation efficiency of the harmful gaseous effluent.

It is another object of this invention to provide an advance scrubber which can meet the standards of environment protection and the requirements of factory safety.

It is a further object of this invention to provide a reliable scrubber for removing soluble materials from harmful gaseous effluents with high efficiency and safety.

It is another object of this invention to provide an advance scrubber which renders the production facilities or processing units continually operating as the supply of the scrubbing liquid terminates.

To achieve these objects, and in accordance with the purpose of the invention, a scrubber of the invention for scrubbing gaseous effluents by a scrubbing liquid is provided. The scrubber comprises a scrubbing chamber, a first gas conduit connecting the top of the scrubbing chamber, a manual valve, a second gas conduit connecting the first gas conduit by the manual valve, a gas exhaust pump exhausting a gaseous effluent to the second gas conduit, a check valve, a third gas conduit having a purge conduit used to transit a purge gas, the third gas conduit connecting the second gas conduit by the check valve, the third gas conduit connecting the bottom of the scrubbing chamber to transit the gaseous effluent into the scrubbing chamber, wherein only effluents from the second gas conduit to the third gas conduit can pass said check valve, a scrubbing liquid supply pipe used to transit a scrubbing liquid into the scrubbing chamber connecting the top of the scrubbing chamber, a recirculation pump used to exhaust the scrubbing liquid connecting the bottom of the scrubbing chamber, a recirculation pipe used to recirculate the scrubbing liquid connecting said recirculation pump and the top of the scrubbing chamber, and a scrubbing liquid drain pipe connecting the scrubbing chamber at a level higher than the perforate plates. The scrubbing chamber further comprises a filter region therein and at least two perforate plates disposed in sequence and under the perforate filter. The filter region comprises a perforate diverter, a perforate filter under the perforate diverter and a plurality of filter media packed between the perforate diverter and the perforate filter.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention can be practiced in conjunction with various techniques that are used in the art, and only so much of the commonly used structures and operation steps are included herein as are necessary to provide an understanding of the present invention. The present invention will be described in detail with reference to the accompanying drawings. It should be noted that the drawings are in greatly simplified form and they are not drawn to scale. Moreover, dimensions have been exaggerated in order to provide a clear illustration and understanding of the present invention.

Figure 1A:
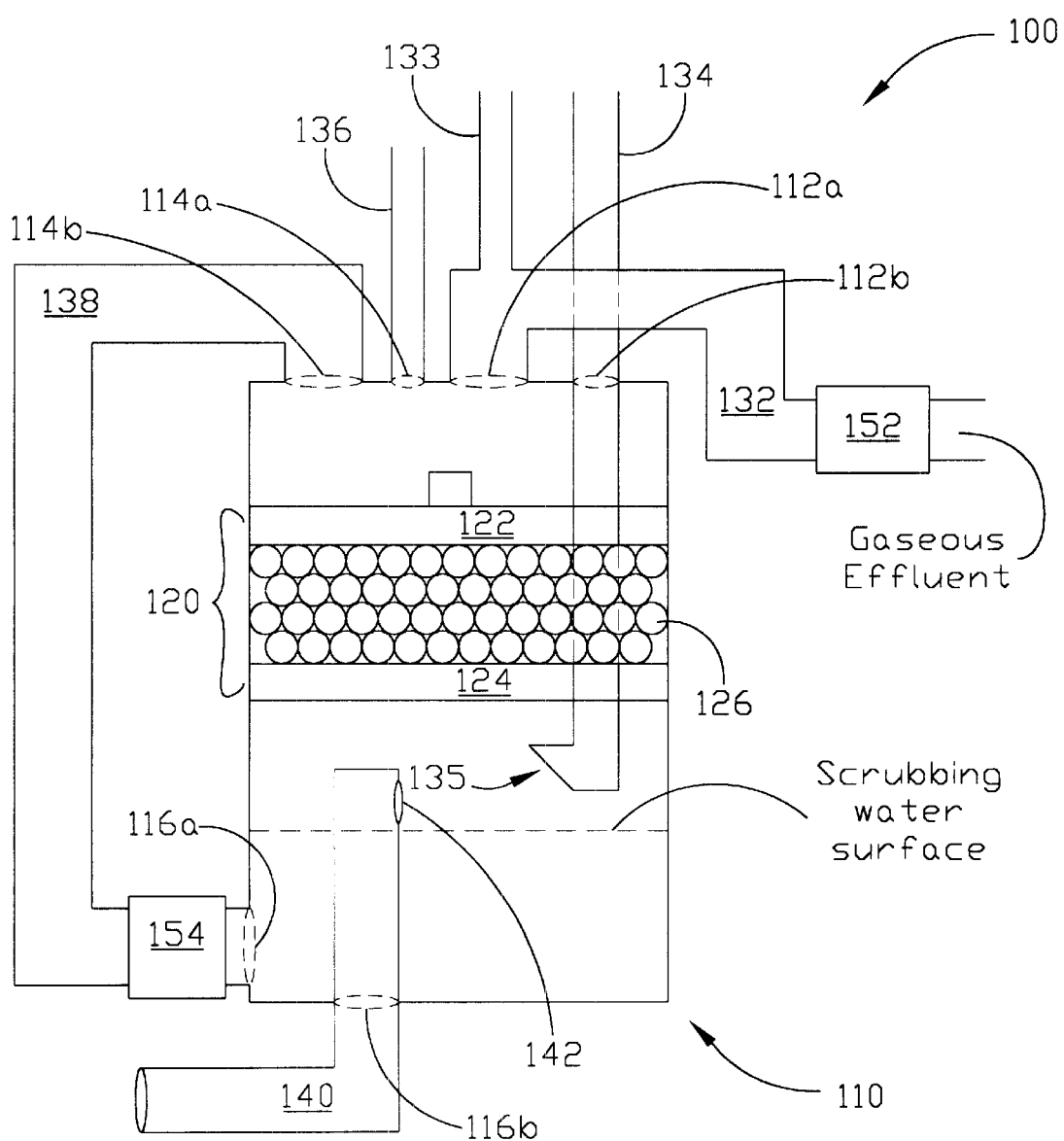
FIG. 1A shows a schematic diagram of a conventional fume scrubber.
Figure 1B:
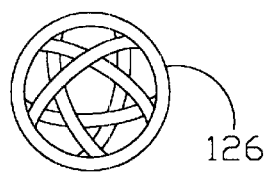
FIG. 1B shows a schematic diagram of a filter medium.
Figure 2A:
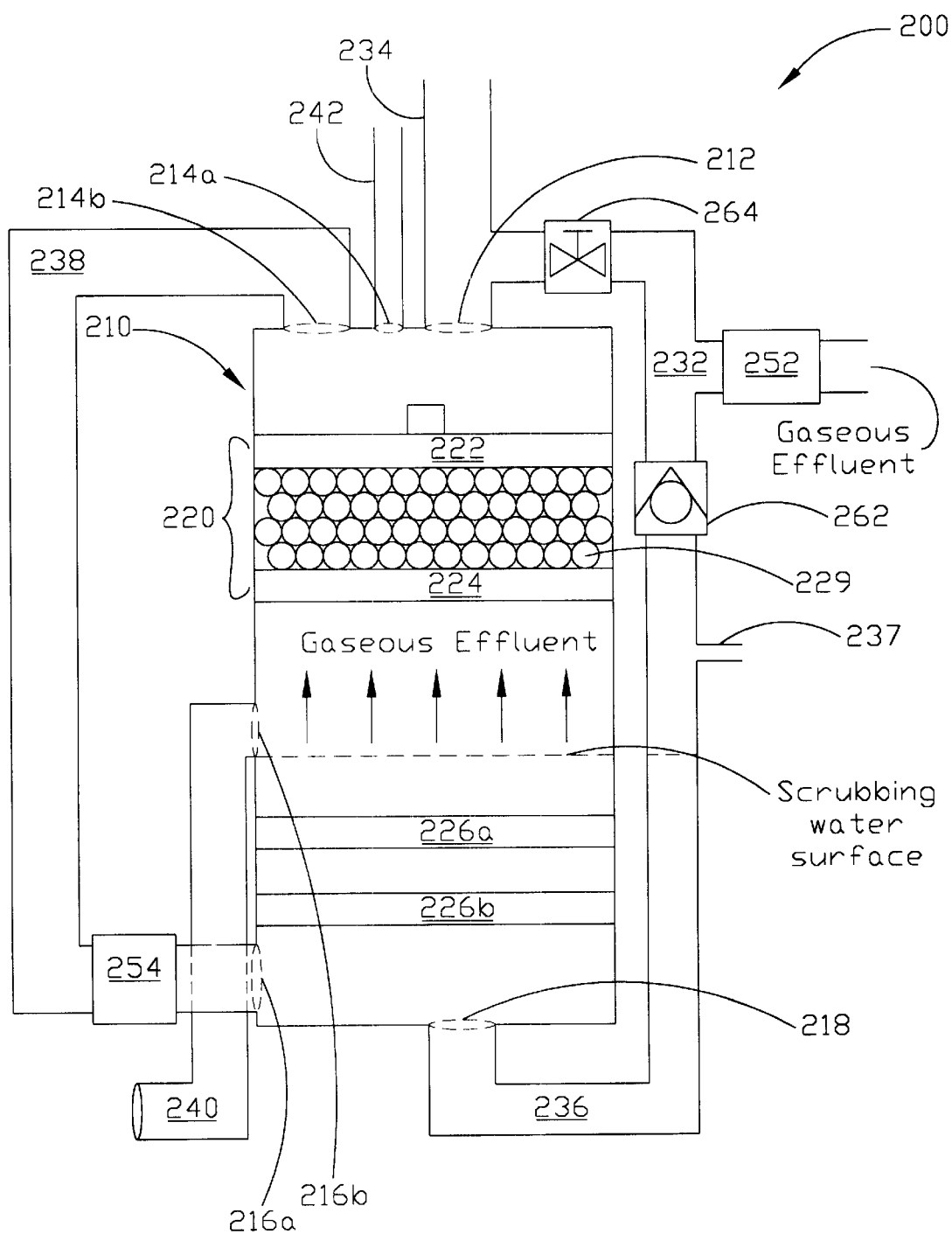
FIG. 2A shows a schematic diagram of a scrubber of this invention.

Referring to FIG. 2A, a scrubber 200 of this invention is shown. As shown in FIG. 2A, a scrubbing chamber 210 having a filter region 220 therein is shown. The filter region 220 comprises a perforate diverter 222 and a perforate filter 224. The perforate diverter 222 and the perforate filter 224 preferably comprise, but are limited to a rotatable perforate plate and a perforate filter plate. Furthermore, the rotatable perforate plate and the perforate filter plate are made of acid-resisting materials. The perforate diverter 222 is used to divert or spread liquid came from above. A plurality of filter media 229 are packed into the filter region 220 and between the perforate diverter 222 and the perforate filter 224. The filter media 229 preferably comprise filter media as shown in FIG. 1B. The detailed structure of the filter media is shown in FIG. 1B. The filter media are comprised of plastic packing spheroids formed of open annular loops as shown in the figure.

Figure 2B:
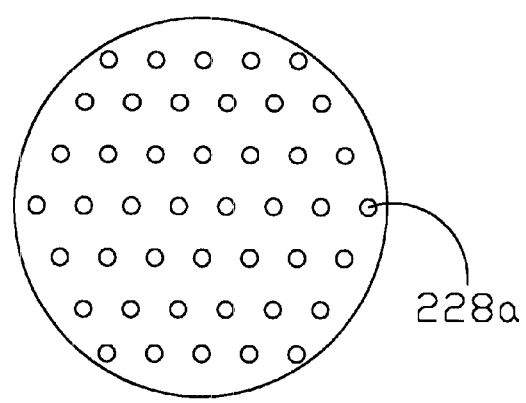
FIG. 2B shows openings of the upper perforate plate.
Figure 2C:
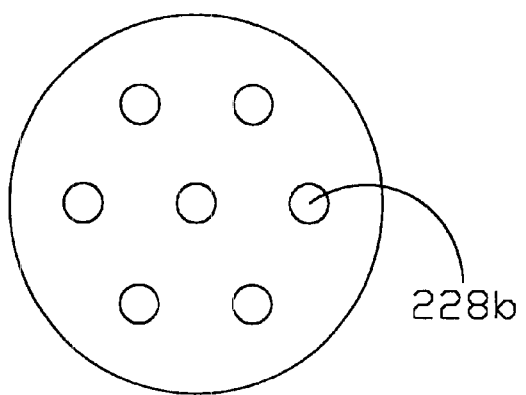
FIG. 2C shows openings of the lower perforate plate.

Two perforate plates 226a and 226b are disposed in the scrubbing chamber 210 and under the filter region 220. The perforate plates 226a and 226b preferably comprise perforate plates made of acid-resisting materials. Moreover, the perforate plates 226a and 226b preferably have openings 228a and 228b separately shown in FIG. 2B and FIG. 2C. The opening 228a of the perforate plates 226a has a size smaller than the size of the opening 228b of the perforate plate 226b. The size of the opening 228a, for example, can be about 1 centimeter. The opening 228b can has a size of about 3 centimeter. It is noted that there can be more than two perforate plates similar to the perforate plates 226a and 226b disposed in the scrubbing chamber 210 and under the filter region 220. Each of the perforate plates disposed has a size of openings which is different from the sizes of openings of other perforate plates, and the perforate plates are disposed in sequence of opening size so that the perforate plate having the smallest openings is disposed at the highest level or a position nearest the filter region 220.

In the top of the scrubbing chamber 210, there are a gas outlet 212, fluid inlets 214a and 214b. In the bottom of the scrubbing chamber 210, there are a fluid outlet 216a and an effluent inlet 218. A pump comprising a gas exhaust pump 252 exhausts gaseous effluents from processing units to the bottom of the scrubbing chamber 210 through a gas conduit 232, a check valve 262 and a gas conduit 236 as shown in FIG. 2A. The flow path of the gaseous effluent set forth is the main gaseous effluent flow path of this invention. The gas conduit 236 further comprises a purge conduit 237 used to introduce a purge gas such as $N_2$ gas. There is a bypass comprising the gas conduit 232, a manual valve 264 and a gas conduit 234 disposed on the top of the scrubbing chamber 210 connecting the gas outlet 212 to a main gas discharge pipe which is not shown. A scrubbing liquid supply pipe 242 used to transit a scrubbing liquid preferably comprising tap water into the scrubbing chamber 210 connects the fluid inlets 214a to a scrubbing liquid supply source which is not shown. A recirculation pipe 238 connecting the fluid inlet 214b and the fluid outlet 216a is used to recirculate the scrubbing liquid supplied via the scrubbing liquid supply pipe 242 from the bottom of the scrubbing chamber 210 back to the filter region 220. This is done by a pump 254 comprising a recirculation pump exhausting the scrubbing liquid. A scrubbing liquid drain pipe 240 connecting a fluid outlet 216b of the scrubbing chamber 210 to a main liquid drain pipe ( not shown) is also shown in FIG. 2A. The scrubbing liquid drain pipe 240 is used to drain the excess scrubbing liquid. The fluid outlet 216b is located on a sidewall of the scrubbing chamber 210 and at a level higher than the perforate plate 226a or the highest perforate plate.

In the operation of the scrubber 200, the gaseous effluent from the processing units is exhausted to the gas conduit 232 by the pump 252 comprising a gas exhaust pump. The gaseous effluent then passes the check valve 262 to the gas conduit 236. The manual valve 264 is closed in normal operation condition. The gaseous effluent next enters the scrubbing chamber 210 through the gas conduit 236, meanwhile, a scrubbing liquid such as tap water flows into the scrubbing chamber 210 via the scrubbing liquid supply pipe 242. As the gaseous effluent continues flowing into the scrubbing chamber 210 via the main flow path set forth, the scrubbing liquid will accumulate at the bottom of the scrubbing chamber 210. Because the gas conduit 236 connects the bottom of the scrubbing chamber 210, the scrubbing liquid will flow into the gas conduit 236, but the scrubbing liquid will be blocked by the check valve 262 so that the scrubbing liquid will not flow into the gas conduit 232. The gas effluent passing through the check valve 262 will contact and sufficiently mix with the scrubbing liquid so that most of the soluble components of the gas effluent will solve in the scrubbing water. In case of formation of bubbles which are obstacles to the solution of the soluble components in the scrubbing liquid, the perforate plates 226a and 226b having well-distributed openings are used. To eliminate the bubbles effectively, more than two perforate plates could be utilized. Each of the perforate plates disposed in sequence has a size of openings which is different from the sizes of openings of other perforate plates, and the perforate plates are disposed in sequence of opening size so that the perforate plate having the smallest openings is disposed at the highest level or nearest the filter region 220. The gaseous effluent passing through the perforate plates 226a and 226b and leaving the scrubbing liquid surface then are exhausted to the main gas discharge conduit (not shown) through the filter region 220 and the gas conduit 234. The gaseous effluent will contact and remix with the scrubbing liquid flow through the filter media 229 of the filter region 220. Moreover, the scrubbing liquid accumulated on the bottom of the scrubbing chamber 210 will be exhausted back to the filter region 220 through the recirculation pipe 238 by the pump 254.

The scrubber of this invention provides a high recirculation efficiency of the harmful gaseous effluent and via twice mixes of the scrubbing liquid and the harmful gaseous effluent so that the standards of environmental protection will be met. Furthermore, the scrubber of this invention prevents the problems of factory safety presenting in the conventional fume scrubber. Owing to the high efficiency of the mixing of the harmful gaseous effluent and the scrubbing liquid, the production facilities or processes units need not stop operating as the supply of the scrubbing liquid terminates.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A scrubber for scrubbing gaseous effluents, said scrubber comprising:
    a scrubbing chamber comprising:
        a filter region therein, said filter region comprising:
            a perforate diverter;
            a perforate filter under said perforate diverter;
            and a plurality of filter media packed between said perforate diverter and said perforate filter;
        at least two perforate plates disposed under said perforate filter each having a plurality of openings;
    a scrubbing liquid supply pipe connecting the top of said scrubbing chamber to transit a scrubbing liquid into said scrubbing chamber from a scrubbing liquid supply source;
    a first gas conduit connecting the top of said scrubbing chamber at a first end of said first gas conduit to exhaust said gaseous effluents from said scrubbing chamber to a main gas discharge conduit;
    a manual valve connecting a second end of said first gas conduit;
    a second gas conduit connecting said manual valve at a first end of said second gas conduit;
    a first pump connecting a second end of said second gas conduit to exhaust said gaseous effluents from processing units into said second gas conduit;
    a check valve connecting a third end of said second gas conduit;
    a third gas conduit connecting said check valve at a first end of said third gas conduit and the bottom of said scrubbing chamber at a second end of said third gas conduit to transit said gaseous effluents into said scrubbing chamber, wherein only effluents from said second gas conduit to said third gas conduit can pass said check valve;
    a recirculation pipe connecting the bottom of said scrubbing chamber at a first end of said recirculation pipe and the top of said scrubbing chamber at a second end of said recirculation pipe;
    a second pump disposed in the path of said recirculation pipe to exhaust said scrubbing liquid from the bottom of said scrubbing chamber to said filter region;
    a scrubbing liquid drain pipe connecting said scrubbing chamber at a level higher than said perforate plates to drain the excess scrubbing liquid.

2. The scrubber according to claim 1, wherein said perforate diverter comprises a rotatable perforate plate.

3. The scrubber according to claim 1, wherein said filter media comprise plastic packing spheroids formed of open annular loops.

4. The scrubber according to claim 1, wherein said perforate plates are disposed in sequence of opening size so that said perforate plate having the smallest openings is disposed at the highest level.

5. The scrubber according to claim 1, wherein said perforate plates comprise acid-resisting perforate plates.

6. The scrubber according to claim 1, wherein said first pump comprises a dry pump.

7. The scrubber according to claim 1, wherein said scrubbing liquid comprises tap water.

8. A scrubber for scrubbing gaseous effluents, said scrubber comprising:
    a scrubbing chamber comprising:
        a filter region therein, said filter region comprising:
            a perforate diverter;
            a perforate filter under said perforate diverter;
            and a plurality of filter media packed between said perforate diverter and said perforate filter;
        at least two perforate plates disposed under said perforate filter each having a plurality of openings;
    a scrubbing liquid supply pipe connecting the top of said scrubbing chamber to transit tap water into said scrubbing chamber from a tap water supply source;
    a first gas conduit connecting the top of said scrubbing chamber at a first end of said first gas conduit to exhaust said gaseous effluents from said scrubbing chamber to a main gas discharge conduit;
    a manual valve connecting a second end of said first gas conduit;
    a second gas conduit connecting said manual valve at a first end of said second gas conduit;

a first pump connecting a second end of said second gas conduit to exhaust said gaseous effluents from processing units into said second gas conduit;

a check valve connecting a third end of said second gas conduit;

a third gas conduit connecting said check valve at a first end of said third gas conduit and the bottom of said scrubbing chamber at a second end of said third gas conduit to transit said gaseous effluents into said scrubbing chamber, and having a purge conduit to transit a purge gas, wherein only effluents from said second gas conduit to said third gas conduit can pass said check valve;

a recirculation pipe connecting the bottom of said scrubbing chamber at a first end of said recirculation pipe and the top of said scrubbing chamber at a second end of said recirculation pipe;

a second pump disposed in the path of said recirculation pipe to exhaust said tap water from the bottom of said scrubbing chamber to said filter region;

a scrubbing liquid drain pipe connecting said scrubbing chamber at a level higher than said perforate plates to drain the excess tap water.

9. The scrubber according to claim 8, wherein said perforate diverter comprises a rotatable perforate plate.

10. The scrubber according to claim 8, wherein said filter media comprise plastic packing spheroids formed of open annular loops.

11. The scrubber according to claim 8, wherein said perforate plates are disposed in sequence of opening size so that said perforate plate having the smallest openings is disposed at the highest level.

12. The scrubber according to claim 8, wherein said perforate plates comprise acid-resisting perforate plates.

13. The scrubber according to claim 8, wherein said first pump comprises a dry pump.

14. The scrubber according to claim 8, wherein said purge gas comprises nitrogen gas.

15. A scrubber for scrubbing gaseous effluents, said scrubber comprising:

a scrubbing chamber comprising;

a filter region therein, said filter region comprising:
a perforate diverter;
a perforate filter under said perforate diverter;
and a plurality of filter media packed between said perforate diverter and said perforate filter;

at least two perforate plates each having a plurality of openings disposed in sequence of opening size and under said perforate filter, wherein said perforate plate having the smallest openings is disposed at the highest level;

a scrubbing liquid supply pipe connecting the top of said scrubbing chamber to transit tap water into said scrubbing chamber from a tap water supply source;

a first gas conduit connecting the top of said scrubbing chamber at a first end of said first gas conduit to exhaust said gaseous effluents from said scrubbing chamber to a main gas discharge conduit;

a manual valve connecting a second end of said first gas conduit;

a second gas conduit connecting said manual valve at a first end of said second gas conduit;

a first pump connecting a second end of said second gas conduit to exhaust said gaseous effluents from processing units into said second gas conduit;

a check valve connecting a third end of said second gas conduit;

a third gas conduit connecting said check valve at a first end of said third gas conduit and the bottom of said scrubbing chamber at a second end of said third gas conduit to transit said gaseous effluents into said scrubbing chamber, and having a purge conduit used to transit a purge gas, wherein only effluents from said second gas conduit to said third gas conduit can pass said check valve;

a recirculation pipe connecting the bottom of said scrubbing chamber at a first end of said recirculation pipe and the top of said scrubbing chamber at a second end of said recirculation pipe;

a second pump disposed in the path of said recirculation pipe to exhaust said tap water from the bottom of said scrubbing chamber to said filter region;

a scrubbing liquid drain pipe connecting said scrubbing chamber at a level higher than said perforate plates to drain the excess tap water.

16. The scrubber according to claim 15, wherein said perforate diverter comprises a rotatable perforate plate.

17. The scrubber according to claim 15, wherein said filter media comprise plastic packing spheroids formed of open annular loops.

18. The scrubber according to claim 15, wherein said perforate plates comprise acid-resisting perforate plates.

19. The scrubber according to claim 15, wherein said first pump comprises a dry pump.

20. The scrubber according to claim 15, wherein said purge gas comprises nitrogen gas.

* * * * *